A. N. DIEHL.
METHOD OF AND APPARATUS FOR TREATING GASES.
APPLICATION FILED AUG. 13, 1910.
1,045,003.
Patented Nov. 19, 1912.
3 SHEETS—SHEET 2.
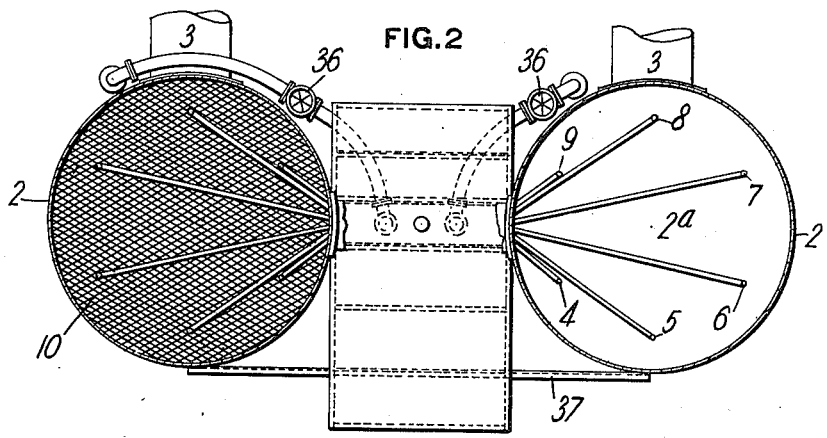
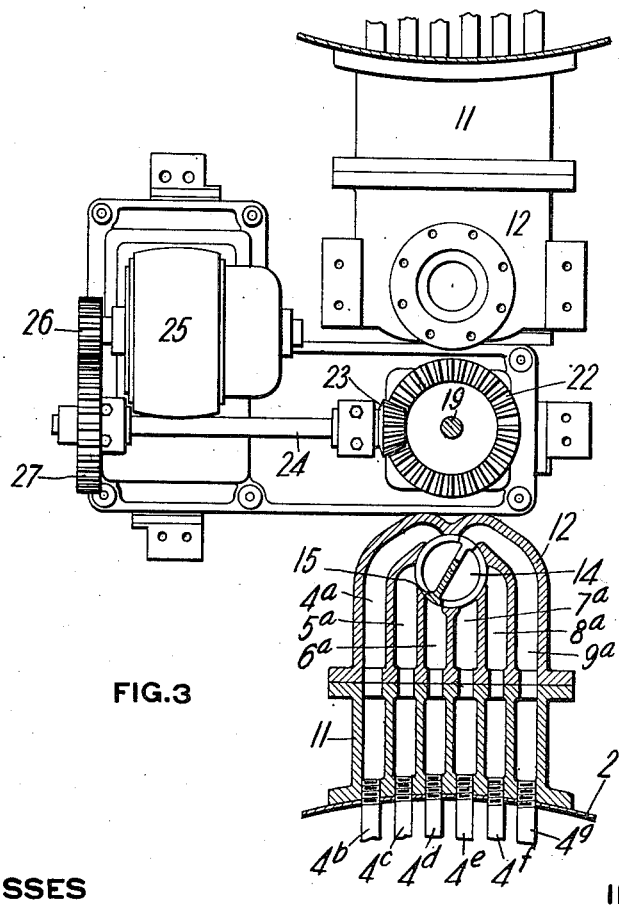
WITNESSES
INVENTOR A. N. DIEHL.
METHOD OF AND APPARATUS FOR TREATING GASES.
APPLICATION FILED AUG. 13, 1910.
1,045,003.
Patented Nov. 19, 1912.
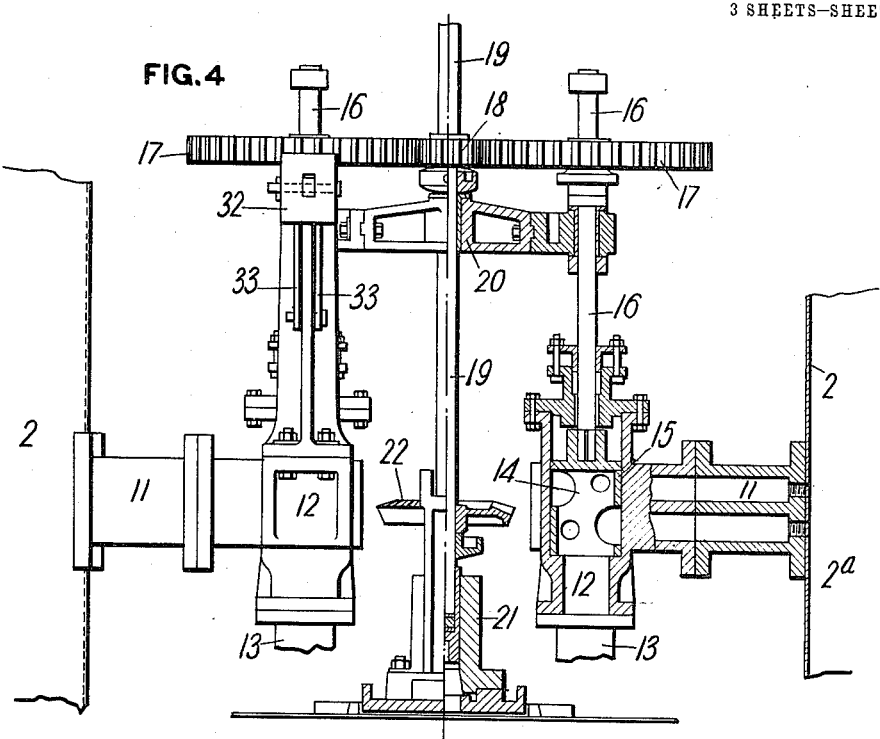
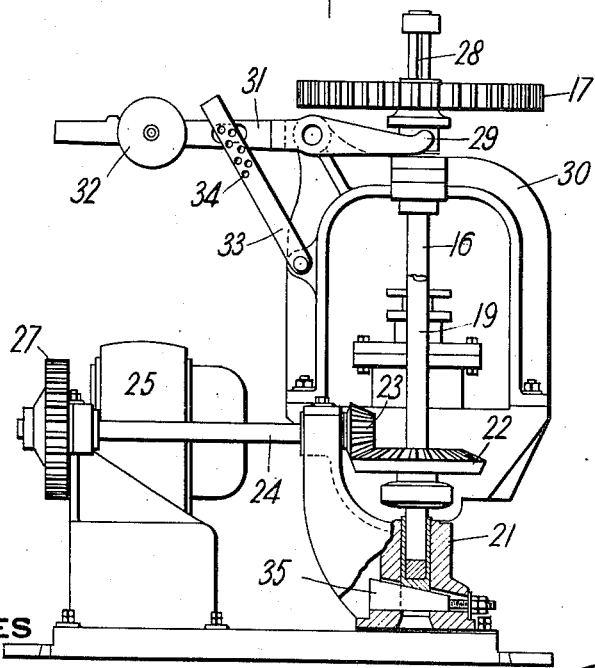

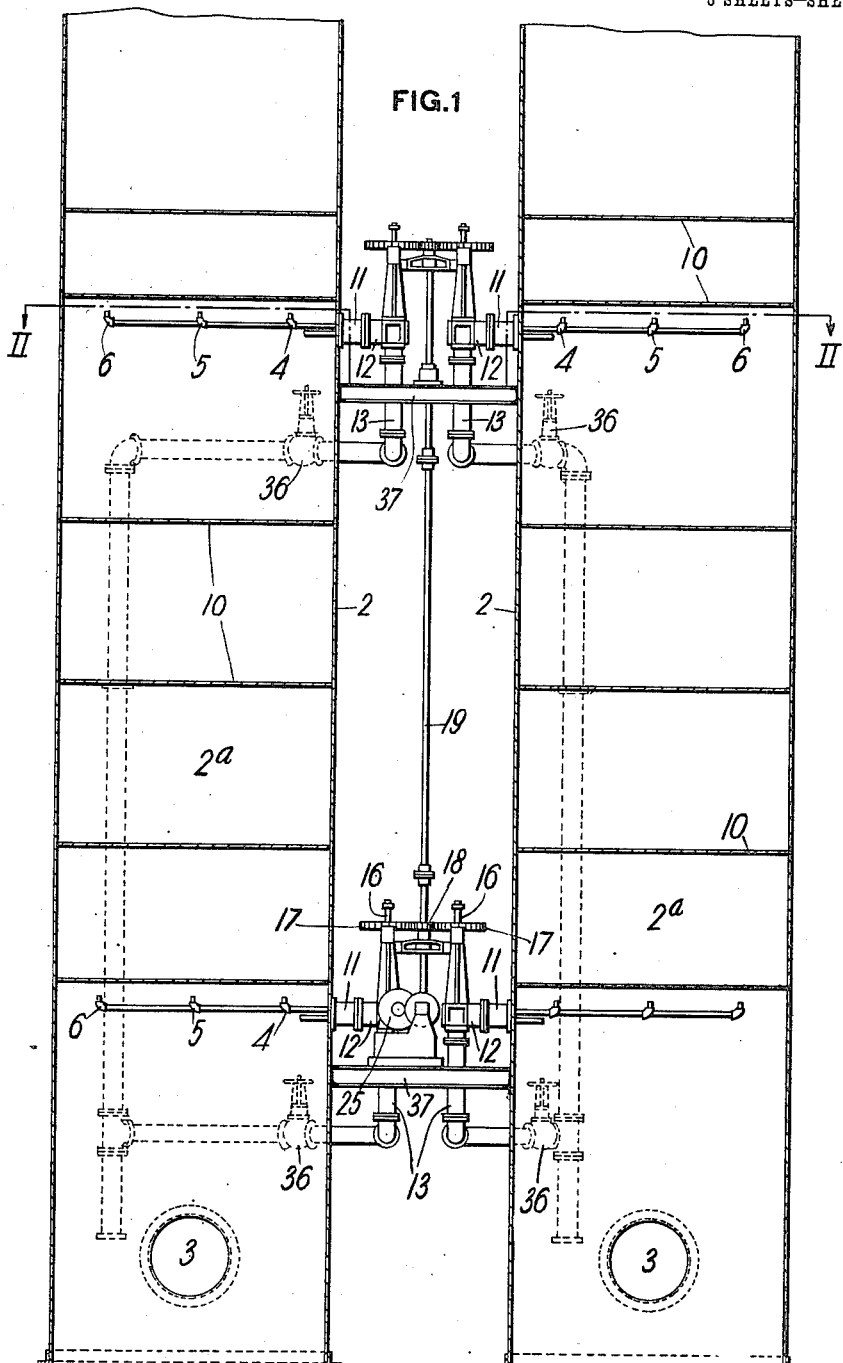

UNITED STATES PATENT OFFICE.

AMBROSE N. DIEHL, OF DUQUESNE, PENNSYLVANIA.

METHOD OF AND APPARATUS FOR TREATING GASES.

1,045,003. Specification of Letters Patent. Patented Nov. 19, 1912.

Application filed August 13, 1910. Serial No. 576,993.

*To all whom it may concern:*

Be it known that I, AMBROSE N. DIEHL, of Duquesne, in the county of Allegheny and State of Pennsylvania, have invented a new and useful Method of and Apparatus for Treating Gases, of which the following is a full, clear, and exact description, reference being had to the accompanying drawings, forming part of this specification.

My invention relates to the treating of gases, such as air or the combustible gases evolved in the operation of blast furnaces or other gas producing apparatus in drying and in removing finely divided solids carried in suspension in the gases being treated and in removing by condensation any foreign materials in suspension or in a gaseous state from the air or gases being treated.

The invention further relates to the construction and arrangement of apparatus by which the treating operations are effected in a rapid and efficient manner.

One object of this invention is to provide a novel method of cooling the gases to at least the point at which vapor or moisture or other material in a gaseous state contained in the gases is condensed and is precipitated, and the gases thereby dried to the extent that the moisture content remaining in the treated gases is reduced to a small and uniform quantity which varies according to the temperature of the cooling medium.

Another object of the invention is to provide a new and effective method of bringing the gases into contact with a cooling medium in cooling and drying the gases, and removing the finely divided solid materials carried in suspension in the gases.

A further object of the invention is to provide a novel method of drying and simultaneously removing from the gases any solids carried in suspension therein.

A still further object of my invention is to provide improved apparatus for bringing the gases into contact with the cooling and cleaning medium to a sufficiently intimate extent to rapidly and cheaply accomplish the desired drying and cleaning operations.

Referring to the accompanying drawings forming part of this specification, Figure 1 is a vertical sectional elevation of one form of apparatus constructed and arranged in accordance with my invention, and adapted for use in carrying out my improved method of cleaning and drying gases. Fig. 2 is a sectional plan of the line II—II of Fig. 1, showing the preferred manner of arranging the jet passages for the cooling medium within the treating chambers of the apparatus. Fig. 3 is a detail plan partly in section showing the rotary spraying valve forming part of the apparatus illustrated in Figs. 1 and 2. Fig. 4 is a side elevation, partly in section, on a larger scale showing a detail of the rotary spraying valves shown in Figs. 1, 2, and 3, and the mechanism employed in operating these valves. Fig. 5 is a side elevation partly in section of the mechanism shown in Fig. 4.

In the drawings, 2 designates the shell of the cylindrical treating chambers $2^a$, as shown, two of these chambers being employed. The chambers $2^a$ are each provided with gas inlet openings 3 in their lower ends and suitable outlet openings are located in the top portion of the chambers to conduct the treated gases from these chambers to a place of use. Located at separated intervals within the chambers $2^a$ are the spraying nozzles 4, 5, 6, 7, 8 and 9, which as shown, are spaced at regular intervals around the vertical center line of the chambers $2^a$. Two sets of these spraying nozzles are shown in each chamber, one being located at some distance above the other within the chamber, as shown in Fig. 1. Located above each set of spraying nozzles are screens 10 of a suitable mesh, a series of these screens being employed between the sets of nozzles, as shown, and two screens being employed above the upper set of nozzles for a purpose described later. The nozzles 4, 5, etc., are each connected to a spray pipe which extends into one of the manifolds 11, two of which are shown secured to the shell of each of the chambers 2. Each of the manifolds 11 is connected by its outer end to a rotary spraying valve 12. The valves 12 and manifolds 11 are provided with twelve passages, each of which is adapted to be connected up with a spraying nozzle within the chamber 2, although as shown but half of these passages are being used, the others being plugged in such case. As will be seen by reference to Figs. 3 and 4 the valve body has a bottom inlet and is provided with a series of side outlets $4^a$, $5^a$, etc., each of these outlets being connected to one or another of the spray pipes 4, 5, 6 etc. The valve disk rotates in the valve shell and has a thickened flange portion 15 of a size which will close one of the outlets 4ª, 5ª and 6ª, so that when the disk 14 is turned or rotated, the passages 4ª, 5ª, etc., are successively closed, and the flow of water thereby momentarily shut off.

The rotary spraying valves 12 are provided with a flanged lower end which is connected to a supply pipe 13 and within the body or shell of the valve 12 is a rotary shell or disk 14 having a thickened or flanged portion 15 on its periphery, which is arranged to successively shut off each of the passages 4ª, 5ª, 6ª, 7ª, 8ª, and 9ª, in the valve, which connect with the spraying nozzles, and with the pipes 4ᵇ, 4ᶜ, 4ᵈ, 4ᵉ, 4ᶠ, and 4ᵍ, which in turn connect these passages with the spraying nozzles 4, 5, 6, etc.

The rotary disk 14 is connected by a vertical spindle or shaft 16 and spur gear 17 with a spur pinion 18 mounted on the vertical driving shaft 19. The shaft 19 is rotatably secured in the bearing 20 and its lower end is mounted in the step bearing 21, (Figs. 4 and 5). The lower end of the driving shaft 19 is provided with a bevel gear 22 through which it is driven, the gear 22 meshing with a bevel pinion 23 on the counter-shaft 24 of the driving motor 25, which is connected by slow-down gears 26 and 27 to the counter-shaft 24. The gears 17 are slidably mounted upon the shafts 16, the feather or spline 28 being provided to permit of vertical movement of the gears 17 on the shafts 16. A sleeve 29 engages with and supports the wheels 17 in raised and lowered positions on the shafts 16.

Pivotally connected to the bracket 30 on the wheel support is a lever arm 31, one end of which is in engagement with the flanged portion of the sleeve 29, the other end of the lever being provided with a counter-weight 32 to counterbalance the weight of the gear 17. Arms 33 having a series of openings 34 therethrough are provided to form a stop for the purpose of holding the gear 17 through the lever 31 in its raised position when the gears 17 are lifted out of engagement with the spur driving pinion 18 in order to disengage one or another of the valves 12. The lower portion of the step bearing 21 is provided with an adjusting wedge 35 by which wear is taken up and the bevel gears 22 and 23 are kept in mesh with each other. It will be noted that there are four of the valves, 12, two being connected to each of the chambers 2, one valve being located above the other on each chamber so as to provide spraying nozzles at different levels in the height of the cooling chamber.

The supply pipes 13 are connected to a suitable source of supply, valves 36 being employed to regulate and shut off the supply of cooling medium to each of the spraying valves 12.

The driving motor 25 and the bearings for the shaft 19 are carried upon suitable beams or supports 37 which in turn are secured to and supported by the shell 2 in the treating chambers.

In the operation of the apparatus in carrying out my improved method, the gases to be treated are conducted into the chambers 2ª through the inlet openings 3. The gases then rise within the chambers 2ª and eventually pass outwardly through an outlet opening provided for that purpose in the top portion of the chambers 2ª. As the gases rise through the chambers 2ª the valves 36 are opened so as to supply, under pressure, a treating fluid to the chambers. The motor 25 is started in operation when the apparatus is put in use, and through the connecting gearing rotates the shaft 19 and through this shaft 19 the valve stems or shafts 16, which are detachably connected to the disks 14 of the rotary spraying valves. The gases, which are under a nominal pressure, pass upwardly through the chambers 2ª and, as the valve disks 14 are caused to rotate, fluid is momentarily shut off from the successive passages 4ª, 5ª, 6ª, etc., in this way momentarily shutting off in succession the supply of cooling medium to the nozzles 4, 5, 6, etc. As shown, but one of these nozzles is shut off at any one time, and, through the remaining nozzles the cooling medium will be forced upwardly within the chamber 2. The pressure at which the cooling medium is admitted will be such that it will be forced to at least a height which will cause the lower series of nozzles to supply cooling medium to the part of the chamber beneath the upper series of nozzles, and the upper series to supply the portion of the chambers above the upper series of nozzles. The screens 10 in the chambers 2ª will break up the streams of fluid issuing from the spray nozzles and cause them to rise in each chamber in the form of small drops or in a rain.

It will be noted that when any one of the nozzles 4, 5, 6, etc., is shut off momentarily, a surrounding wall of rising cooling medium is formed by the remaining nozzles which are open and that in this way a pocket is formed within the chamber through which a stream of fluid is not being forced. The gases rising in the chamber, following the line of least resistance, will collect in this pocket and about the time the gases are collected therein, the spraying valve will have opened the particular nozzle directly beneath this pocket and will force the fluid through the pocket of gases, in this way the gases being brought into very much more intimate contact with the treating fluid than has been heretofore possible with existing apparatus.

The spraying valves are timed so as to open and close each of the spraying nozzles a number of times while the gases are passing upwardly through the chambers within the range of the fluid sprayed from each nozzle. As each nozzle successively opens and closes the formation of the pockets within the chambers will be in different portions of the chambers and the gases will rise in a tortuous spiral path, in this way moving the pockets of gases transversely as well as upwardly during their passage through the chamber, this again lending itself to a more intimate contact of the cooling and drying medium with the gases. The column of rising gases is subjected to the influence of as many of the sets of spraying nozzles as is found necessary, in the apparatus shown two sets being employed. The so-treated gases then pass outwardly through the outlet opening to a point of further treatment or use, and fresh gases being constantly supplied, the operation is carried out continuously, while gases are supplied to the apparatus.

The advantages of my invention will be apparent to those skilled in the art. By subjecting the gases to the repeated action of the jets or streams of water, at a higher velocity than the column of gases, the treating medium is brought into very intimate contact with the gases, the heated gases are cooled to a point at which contained vapor or moisture is cooled to below the condensation point and is precipitated in the form of water within the chamber, in this way reducing the amount of moisture present in the gases to a small and constant percentage depending upon the temperature of the cooling medium. Any solid materials carried in suspension in the gases are moistened by contact with the sprays of water and by reason of the added weight of the absorbed moisture are arrested in their upward movement and finally by force of gravity is deposited in the bottom portion of the apparatus from which it is easily and quickly removed, as found necessary or desirable.

Modifications in the construction and arrangement of the parts may be made without departing from my invention. The number of sets of spraying jets employed may be changed; the location and number of the screens may be varied; the size and shape of the cooling chambers may be modified, and other changes may be made within the scope of the claims. The sprays may be turned downwardly instead of upwardly thereby bringing the coolest water last in contact with the gases or the lower sprays turned upwardly and the top downwardly. A number of small chambers can be used instead of one large one so as to lower the head of water. The chambers may be placed in a horizontal position. When found desirable artificial means may be employed for cooling the water used in carrying out my improved method and when used solely in drying air, the cooled water not being contaminated can be used over and over and in this way reduce the quantity of water required. The gases may be treated at or below atmospheric pressure or may be treated after compression as well as by alternately compressing and expanding the gases during treatment in drying and cleaning.

I claim:—

1. The method of treating gases consisting in passing the gases through a treating chamber, injecting a series of streams of water into the gases during their passage therethrough, and successively interrupting the flow of each stream of water at intervals.

2. The method of treating gases consisting in passing the gases through a treating chamber and spraying a plurality of streams of water into the gases in the direction of their passage through the chamber, interrupting the flow of part of such streams at intervals and thereby forming pockets of gases within the chamber, the spraying streams of water forming and defining the side walls of said pockets.

3. The method of treating gases consisting in passing the gases through a treating chamber and spraying a plurality of streams of water into the gases in the direction of their passage through the chamber, and successively interrupting the flow of said streams of water within the treating chamber.

4. In a gas treating apparatus, the combination of a chamber, a plurality of spraying nozzles within said chamber, and means for successively interrupting the flow of liquid from said nozzles thereby forming a traveling pocket within said spraying medium and bringing the gases contained in said pocket into intimate contact with the spraying medium.

5. In a gas treating apparatus, the combination of a chamber, a plurality of spraying nozzles within said chamber, means for supplying liquid to said nozzles, and valve means for successively interrupting the flow of liquid to said nozzles thereby forming a traveling pocket in the spraying medium within said chamber and bringing the gas within said pocket into intimate contact with said spraying medium.

6. In a gas treating apparatus, the combination of a chamber, a plurality of spraying nozzles within said chamber, means for supplying liquid to said nozzles, a rotatable valve in said supplying means, said valve being adapted to successively interrupt the flow of liquid to said nozzles, and means for actuating said valve.

7. In a gas treating apparatus, the combination of a chamber, a plurality of spraying nozzles substantially equally distant from the central line of said chamber, and means for successively interrupting the flow of liquid to said nozzles thereby forming a traveling pocket within the spraying liquid and bringing the gases within said pocket into intimate contact with said spraying medium.

8. In a gas treating apparatus, the combination of a chamber, a plurality of series of spraying nozzles within said chamber, and means for successively interrupting the flow of liquid to the nozzles of each series, thereby forming a traveling pocket in the spraying liquid of each series of nozzles and bringing the gases within said pocket into intimate contact with the spraying liquid.

9. In a gas treating apparatus, the combination of a plurality of chambers, a series of spraying nozzles within each of said chambers, and means associated with each chamber for successively interrupting the flow of spraying liquid from said nozzles, thereby forming a traveling pocket in the spraying liquid of each series of nozzles and bringing the gases in said pocket into intimate contact with said spraying liquid.

10. The method of treating gases which consists in forming a spraying medium by a plurality of streams of liquid, successively interrupting the flow of said streams thereby forming traveling pockets in said spraying medium, and supplying gas to said pockets, said gas being thereby brought into close contact with the spraying medium.

In testimony whereof, I have hereunto set my hand.

AMBROSE N. DIEHL.

Witnesses:
GEO. L. NEFF,
T. E. McDOWELL.